Patented Mar. 21, 1933

1,901,925

UNITED STATES PATENT OFFICE

WILLIAM J. O'BRIEN, OF CLEVELAND, OHIO, AND JOSEPH E. DRAPEAU, JR., OF NEW YORK, N. Y., ASSIGNORS TO THE GLIDDEN COMPANY, OF CLEVELAND, OHIO, A CORPORATION OF OHIO

PROCESS FOR REMOVING CHLORINE FROM ZINC SULPHATE SOLUTIONS

No Drawing. Application filed May 6, 1931. Serial No. 535,570.

In a process for the manufacture of lithopone, the chlorine content of the zinc sulphate solution plays a very important part. Chlorine down to one part per million of chlorine per liter of zinc sulphate solution 35° Beaumé 60° Fahrenheit will affect appreciably the photogenic properties of lithopone. Attention is called to the literature on the manufacture of lithopone and to the following patents:

Breyer, Croll & Farber—U. S. Patent No. 1,411,645—Issued April 4, 1922
Singmaster & Breyer—U. S. Patent No. 1,411,646—Issued April 4, 1922
Singmaster & Breyer—U. S. Patent No. 1,411,647—Issued April 4, 1922
Singmaster & Breyer—U. S. Patent No. 1,411,648—Issued April 4, 1922
Breyer & Farber—U. S. Patent No. 1,446,637—Issued Feb. 27, 1923
Singmaster & Breyer—U. S. Patent No. 1,414,793—Issued May 2, 1922.

Chlorine in zinc sulphate solutions used for electrolytic zinc also is an objectionable feature because of anode losses, etc. The part chlorine plays in lithopone manufacture and in electrolytic zinc is so important that lithopone manufacturers will not use zinc materials containing over .5% chlorine. Also, electrolytic zinc manufacturers are faced with the problem of the disposal of their dross containing from .2% to .3% chlorine. This dross is the by-product recovered from the spelter furnaces where they use zinc chloride in melting down the anode.

The authors are aware that a great deal of work has been done in the past on the removal of chlorine from both copper sulphate solutions and zinc sulphate. In the removal of chlorine from copper sulphate solutions, the chlorine has been removed as cuprous chloride, according to the following patents:

Dr. Carl Hopfner—British Patent No. 18,080—Issued in 1890
F. Laist—U. S. Patent No. 903,732—Issued Nov. 10, 1908
F. Laist—U. S. Patent No. 1,104,907—Issued July 28, 1914 and the following references:
1. "The Leaching Process at Chuquicamata Chile" by C. W. Eichrodt—A. I. M. E. 1930 Transactions.
2. The Hunt and Douglas Process copper dissolution as sulphate and precipitation as insoluble $Cu_2Cl_2$ as described in Transactions A. I. M. E. Vols. X and XVI.

The authors in studying various references and the literature on this subject, have found that in no case has a practical or economical solution of the problem been obtained and that decided improvements over the present art would have to be made be- the process of removing chlorides from zinc sulphate solutions would be economically sound.

Citing some of the difficulties in the various proposed methods, we might mention the presence of arsenic, which generally occurs in zinc sulphate solutions, particularly in zinc sulphate solutions made from zinc bearing fumes. The authors have found that if the right conditions are obtained, one pound of copper will precipitate one pound of chlorine as cuprous chloride. However, in the presence of arsenic unless the proper conditions of precipitation are used the arsenic will go down with the copper as insoluble copper compounds and the consumption of copper will greatly increase the cost for the removal of chlorine. Iron, which is always present in zinc sulphate solutions in varying quantities, also interferes with this reaction and unless the operation is carried on under the proper conditions the iron will precipitate with the copper, interfering with the subsequent regeneration of the copper.

It was also found in this experimental work that the more nearly neutral or basic a solution was the more colloidal and slimy the copper chloride precipitate. The authors found it practically impossible to filter or handle the resulting cuprous chloride unless special conditions were used in the treating.

The authors have found that the reaction of $CuCl_2 + Cu = Cu_2Cl_2$ must be carried on in an acid reaction. They found that the optimum condition for precipitation of the cuprous chloride is that the zinc sulphate solution must contain between .2% and 1.5% free sulphuric acid depending upon the impurities present. For example, if the zinc sulphate solution is low in arsenic and iron, .2% of free sulphuric acid is permissible and will work satisfactorily.

The authors have also found that under the conditions of the process, the reaction $CuCl_2 + Cl_2$ is endothermic and therefore should be carried out in hot solutions.

The process of removing chloride from zinc sulphate, therefore, differs from the methods already described in the literature by maintaining a definite acid condition and a certain temperature. Our process is as follows:

Zinc sulphate from approximately 35° Beaumé at 60° Fahrenheit, containing varying amounts of impurities which usually occur with impure zinc sulphate, such as arsenic, iron, manganese, tin, copper, chlorine, etc., is run into a large treating tank and heated to a temperature ranging from 140° to 200° Fahrenheit. The acidity of the zinc sulphate solution is brought to the proper amount, varying between .2% and 1.5%, depending upon the amount of impurities, particularly iron and arsenic. It is preferred to operate at the minimum acid content to lessen subsequent steps in the operation. The amount of acid used is also affected by the colloidal and slimy nature of the cuprous chloride, which in turn is affected by the varying amounts of impurities, particularly tin. Sufficient acid should be present so as to produce the necessary coagulating effect on the cuprous chloride and prevent the coprecipitation of the arsenic, iron, and possibly tin, and prevent the oxidation of colloidal oxide if tin should be present.

To the zinc sulphate solution described above, is added sufficient copper sulphate to combine with the chlorine present so that chlorine existing in the zinc sulphate solution exists in the presence of sufficient copper as copper sulphate to combine with it.

To the zinc sulphate solution containing copper sulphate solution is now added sufficient copper powder to convert the chlorine to insoluble cuprous chloride.

After the reaction has been completed the solution is filtered. The cuprous chloride retained on the filter is regenerated by mixing with it in a suitable tank sufficient zinc dust or a similar electro-negative metal to combine with the chlorine, and regenerate again the copper, which can be used again in the process.

The authors claim:

The process of removing chlorine from a zinc sulphate solution consisting in heating said zinc sulphate solution to a temperature ranging from 140° to 200° Fahrenheit, adding sulphuric acid in sufficient quantity to bring the acidity of the zinc sulphate solution within a range of .2% to 1.5%, adding sufficient copper sulphate to combine with the chlorine present and adding sufficient copper powder to convert the chlorine in the presence of the copper sulphate into insoluble cuprous chloride which is removed by filtration.

WILLIAM J. O'BRIEN.
JOSEPH E. DRAPEAU, Jr.